(12) United States Patent
Rufino et al.

(10) Patent No.: US 9,776,704 B1
(45) Date of Patent: Oct. 3, 2017

(54) COMPOSITE PRESSURE BULKHEAD

(71) Applicant: The Boeing Company, Chicago, IL (US)

(72) Inventors: Russell Rufino, Mount Royal, NJ (US); Kyle McNamara, Gibbstown, NJ (US); Ta Yau Lin, Media, PA (US); Brice A. Johnson, Federal Way, WA (US); Robert Vitlip, Glenn Mills, PA (US)

(73) Assignee: The Boeing Company, Chicago, IL (US)

( * ) Notice: Subject to any disclaimer, the term of this patent is extended or adjusted under 35 U.S.C. 154(b) by 36 days.

(21) Appl. No.: 15/155,802

(22) Filed: May 16, 2016

(51) Int. Cl.
*B64C 1/10* (2006.01)
*B64C 1/00* (2006.01)

(52) U.S. Cl.
CPC ........ *B64C 1/10* (2013.01); *B64C 2001/0072* (2013.01)

(58) Field of Classification Search
CPC ..... Y10T 428/24099; Y10T 428/24124; Y10T 428/24083; B64C 1/10
See application file for complete search history.

(56) References Cited

U.S. PATENT DOCUMENTS

| | | | |
|---|---|---|---|
| 5,062,589 A | 11/1991 | Roth et al. | |
| 6,378,805 B1 | 4/2002 | Stephan et al. | |
| 8,939,404 B2 | 1/2015 | Sayilgan et al. | |
| 9,187,168 B2 | 11/2015 | Rosman et al. | |
| 2008/0179459 A1 | 7/2008 | Garcia Laja et al. | |
| 2011/0101164 A1 | 5/2011 | Koch et al. | |
| 2014/0370227 A1* | 12/2014 | Diep ...................... | B64D 45/00 428/66.4 |

OTHER PUBLICATIONS

Composite Manufacturing, Electroimpact, www.electroimpact.com/products/compositesioverview.aspx, Mar. 18, 2016.

* cited by examiner

*Primary Examiner* — Alexander Thomas
(74) *Attorney, Agent, or Firm* — Ostrager Chong Flaherty & Broitman PC (57) ABSTRACT

A pressure bulkhead for a pressurized vehicle such as an aircraft employs a plurality of layers of composite fiber material having uni-directional fibers arranged in a single direction within the composite fiber material. The pressure bulkhead incorporates non-traditional radial and circumferential stiffening members into a composite laminate and aligns the radial stiffening members with the direction of dominant load paths. The radial and circumferential stiffening members are interlaid between full layers of the composite fiber material. Related methods of manufacturing the pressure bulkhead include using automated fiber placement equipment to form each layer of the pressure bulkhead and discretely orient the integral stiffeners and the uni-directional fibers in each layer.

20 Claims, 11 Drawing Sheets

COMPOSITE PRESSURE BULKHEAD

TECHNICAL FIELD

This disclosure generally relates to pressure bulkheads and, more particularly, to composite pressure bulkheads for use in vehicles and methods for manufacturing such composite pressure bulkheads.

BACKGROUND

Pressure bulkheads are used in vehicles, such as aircraft, to separate a pressurized compartment from an unpressurized compartment, and to provide sufficient structural strength to support the strains and loads on the vehicle resulting from pressurization. In one typical application, a pressure bulkhead is mounted within an aircraft fuselage and attached to the outer skin of the aircraft. Many pressure bulkheads have a partial spherical or substantially spherical shape with a curved or dome-shaped surface. Such bulkheads are mounted in an aircraft fuselage with the concave (or inner curved) side of the dome-shaped surface facing the pressurized compartment and the convex (or outwardly curved) side of the dome-shaped surface facing the non-pressurized compartment.

Traditional pressure bulkhead designs utilize metallic or composite stiffening members (or stiffeners) that are mechanically fastened, co-bonded or co-cured to a web that forms the dome-shaped surface, and typically are composed of multiple sections and parts. Bolting, co-bonding and co-curing stiffeners adds cost, labor and flow time to pressure bulkhead development and manufacturing processes, and often result in heavy and complex pressure bulkhead designs. Other designs that use composite layups with hand laid, grid based patterns result in inherent structural inefficiencies.

It is therefore desirable to provide a lightweight and low-cost pressure bulkhead having relatively simple construction and sufficient structural strength to meet load and strain requirements of a pressurized compartment in a vehicle.

SUMMARY

The foregoing purposes, as well as others, are achieved by integrating radial stiffener members that extend in non-traditional directions and circumferential stiffening members, both having uni-directional fibers, within a composite laminate during manufacture of the composite laminate to form a pressure bulkhead having composite stiffening members aligned with the direction of dominant load paths in the vehicle in which the pressure bulkhead is installed. The uni-directional fibers in the composite stiffening members are discretely oriented with the direction of the dominant load paths using automated fiber placement equipment to steer the fibers in the desired directions. Integrating discretely oriented stiffening members within the composite laminate during production of the composite laminate eliminates the need for secondary stiffening elements and reduces production time and cost because the pressure bulkhead is complete as it is laid up. The non-traditional directions of the radial stiffener members also save weight by tailoring strength of the pressure bulkhead.

Embodiments disclosed herein provide a pressure bulkhead comprising a plurality of layers of composite fiber material having uni-directional fibers arranged in a single direction within the composite fiber material. The plurality of layers comprises two or more full layers of the composite fiber material. The uni-directional fibers in each full layer are generally parallel to each other and are positioned at an orientation angle in the pressure bulkhead. The orientation angle of the uni-directional fibers in one of the full layers is different from the orientation angle of the uni-directional fibers in at least one other full layer. A circumferential stiffener layer is interlaid between the full layers and comprises a plurality of curvilinear tearstraps having a curvilinear shape, for example, complete or partial circular, elliptical or oval shapes. A radial stiffener layer is interlaid between the full layers and comprises a plurality of stiffeners extending radially from a central portion of the pressure bulkhead toward a periphery of the pressure bulkhead. The uni-directional fibers in each of the stiffeners in the radial stiffener layer are generally parallel to each other and aligned in a direction of dominant load paths in the pressure bulkhead.

The embodiments also disclose a method for manufacturing a pressure bulkhead with integrated and discretely oriented stiffening members. A composite fiber material having uni-directional fibers arranged in a single direction within the composite fiber material is fiber placed in adjacent rows to form a first full layer of the composite fiber material. A plurality of curvilinear tearstraps comprising the composite fiber material is fiber placed onto the first full layer and tow steered into a curvilinear shape, for example, partial or complete circular, elliptical or oval shapes to form a circumferential stiffener layer. A plurality of stiffeners comprising the composite fiber material is fiber placed onto the first full layer or onto the circumferential stiffener layer such that the plurality of stiffeners extend radially from a central portion of the pressure bulkhead toward a periphery of the first full layer to form a radial stiffener layer. The uni-directional fibers in each of the stiffeners in the radial stiffener layer are aligned in a direction of dominant load paths in the pressure bulkhead. A second full layer of the composite fiber material is fiber placed onto the circumferential stiffener layer and the radial stiffener layer, such that the circumferential stiffener layer and the radial stiffener layer are interlaid between the first full layer and the second full layer.

In alternative embodiments of the method, the radial stiffener layer may laid up onto the full layer and the circumferential stiffener layer may be laid up on top of the radial stiffener layer, or a third or more full layers may be laid up between the radial stiffener layer and the circumferential stiffener layer.

An aircraft is also disclosed comprising a fuselage having a skin and a composite pressure bulkhead as disclosed herein attached to the skin about a periphery of the composite pressure bulkhead.

Other objects, features, and advantages of the various embodiments in the present disclosure will be explained in the following detailed description with reference to the appended drawings.

BRIEF DESCRIPTION OF DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Figure 1:
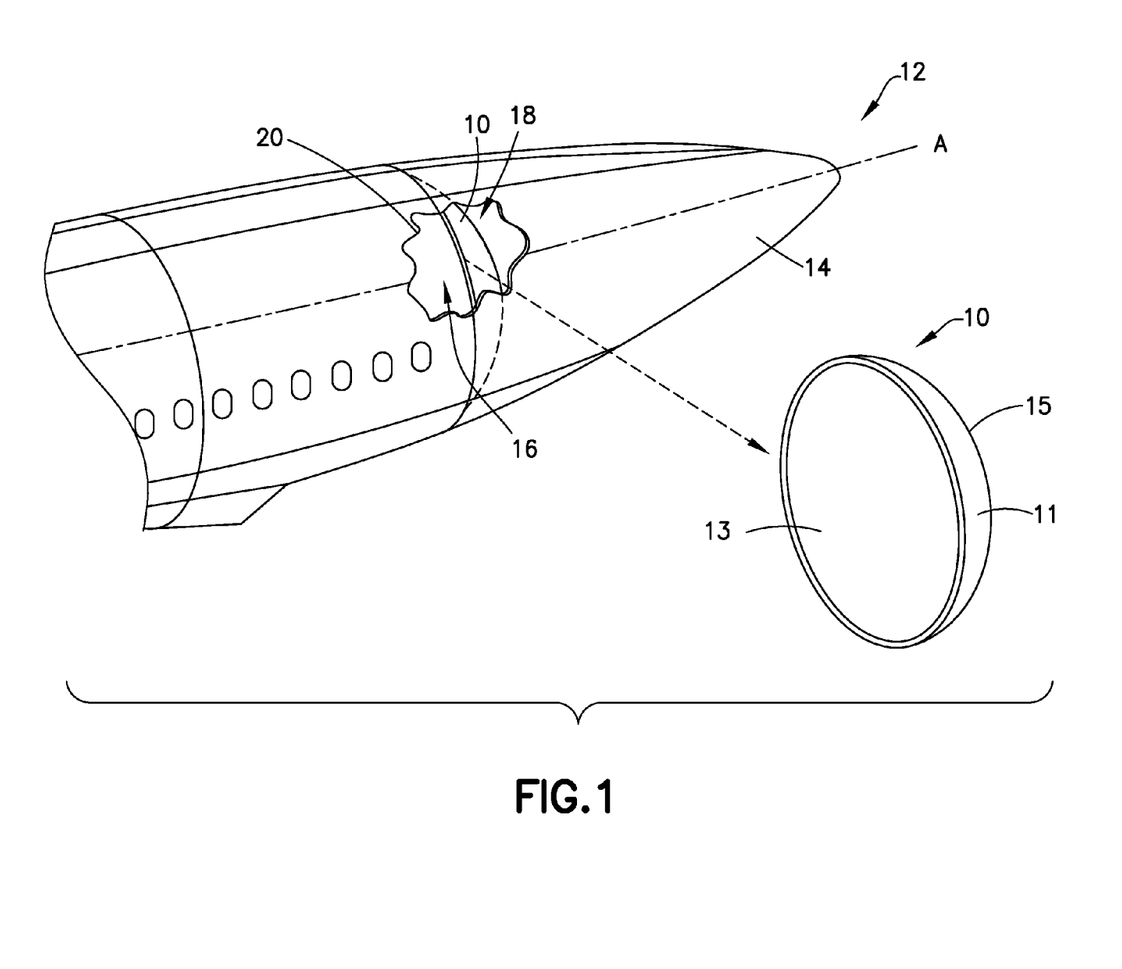
FIG. 1 is a schematic, perspective view of the disclosed composite pressure bulkhead, shown mounted in an aircraft.
Figure 2:
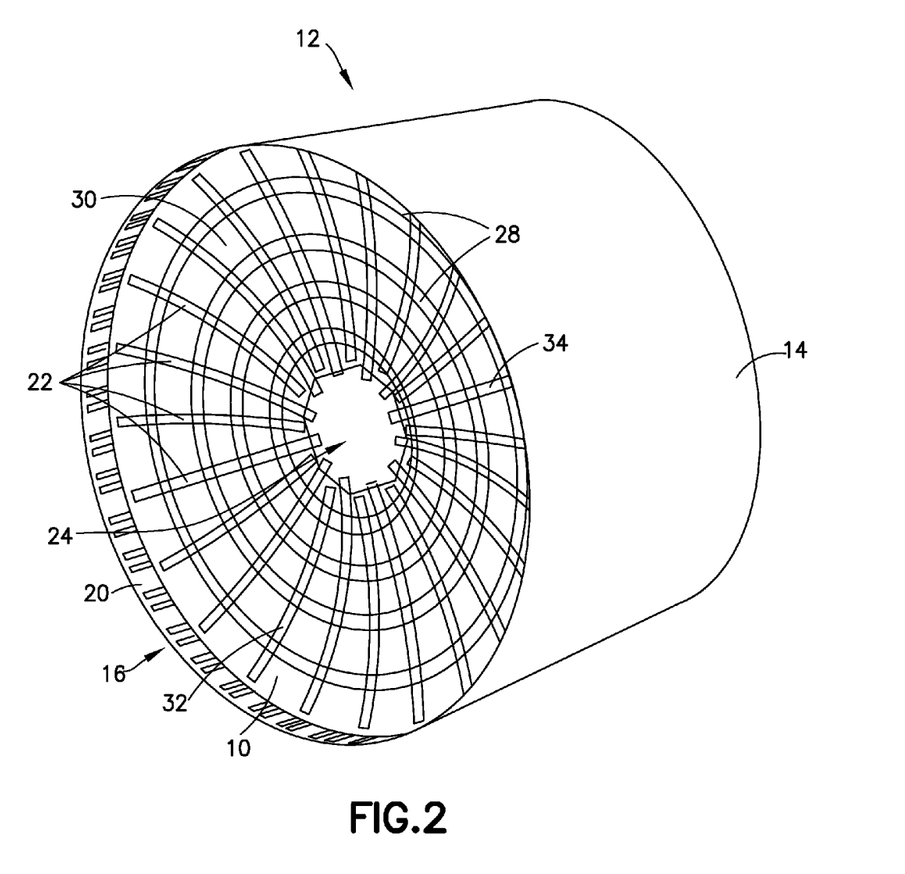
FIG. 2 is a perspective view of the composite pressure bulkhead of FIG. 1, taken from the pressurized side, shown mounted in a section of aircraft fuselage.

Referring to the drawings, and more particularly to FIGS. 1 and 2, the disclosed composite pressure bulkhead 10 is in the form of a disk having a dome-shaped surface 11 with a concave (or inner curved) side 13 and a convex (or outwardly curved) side 15. The pressure bulkhead 10 is shaped for placement inside a vehicle, such as an aircraft 12, for example in the fuselage 14 of the aircraft 12 to separate a pressurized fuselage interior 16 (e.g., a pressurized passenger cabin and/or cargo area) from an unpressurized fuselage interior 18. The shape of the pressure bulkhead 10 is determined by the cross-sectional shape of the fuselage 14, and will therefore vary depending on the type of vehicle the pressure bulkhead 10 is designed for. The pressure bulkhead 10 may be attached to fuselage skin 20 about a periphery 26 of the pressure bulkhead 10, such that the pressure bulkhead 10 does not shift along fuselage longitudinal axis A of the aircraft 12, using any conventional attachment method. The concave side 13 of the dome-shaped surface 11 faces the pressurized fuselage interior 16 and the convex side 15 of the dome-shaped surface 11 faces the un-pressurized fuselage interior 18.

Although various embodiments of the composite pressure bulkhead 10 are described with reference to an exemplary aircraft 12 to illustrate the general principles in the present disclosure, it will be recognized by one skilled in the art that the present disclosure may be practiced in other analogous applications or environments and/or with other analogous or equivalent variations of the illustrative embodiments. For example, other types of vehicles may employ the disclosed pressure bulkhead 10, such as other types of aircraft, spacecraft, reentry vehicles, orbiting space stations, land vehicles and marine vehicles, such as submarines. It should also be noted that those methods, procedures, components, or functions which are commonly known to persons of ordinary skill in the field of the disclosure are not described in detail herein.

Figure 3:
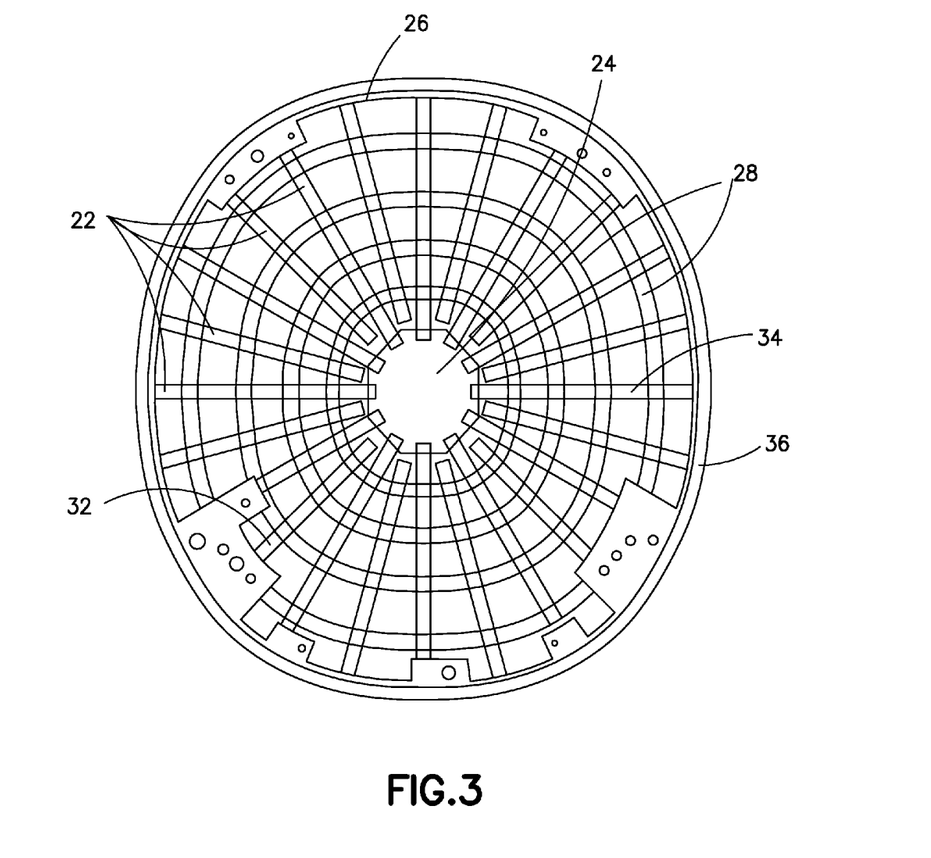
FIG. 3 is a front elevational view of the composite pressure bulkhead of FIG. 1, taken from the pressurized side.
Figure 4A:
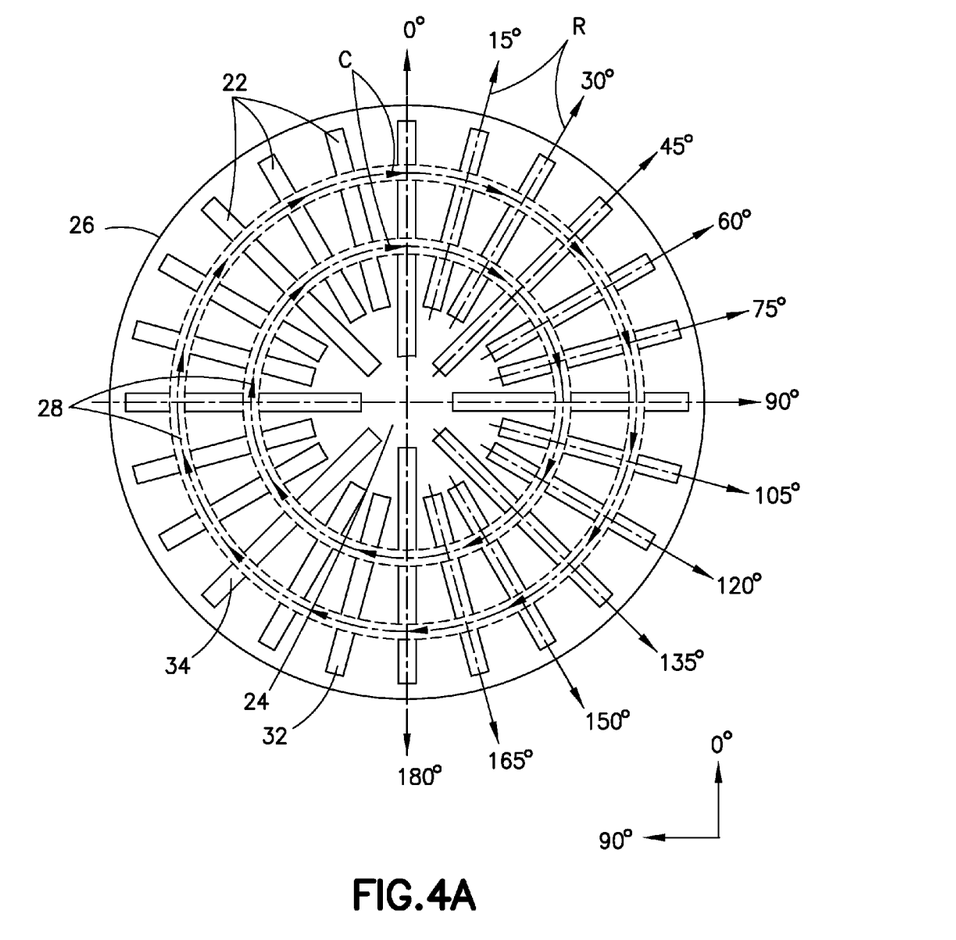
FIG. 4A is an illustration of a front elevational view of another embodiment of a composite pressure bulkhead in accordance with this disclosure.
Figure 4B:
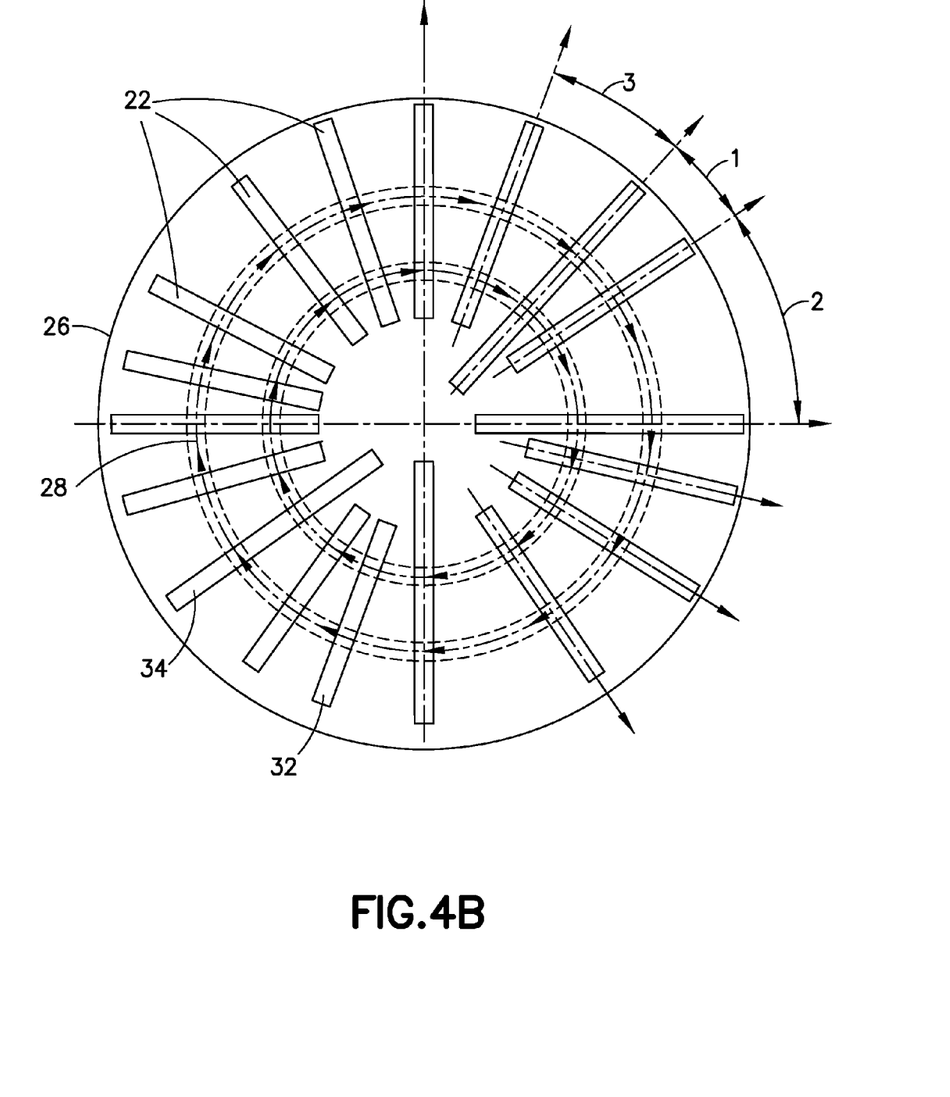
FIG. 4B is an illustration of a front elevational view of yet another embodiment of a composite bulkhead in accordance with this disclosure.

As shown in FIGS. 2-4, the pressure bulkhead 10 includes a plurality of radial stiffeners 22 integrally formed within the pressure bulkhead 10 and extending radially from a central portion 24 toward the periphery 26 of the pressure bulkhead 10, a plurality of curvilinear tearstraps 28 integrally formed within the pressure bulkhead 10 and positioned generally about the central portion 24 of the pressure bulkhead 10, and a web 30, all made from a composite fiber material 46. As will be described with reference to FIGS. 5 and 6 below, the pressure bulkhead 10 comprises a plurality of layers of the composite fiber material 46 including two or more full layers 40 of the composite fiber material 46, at least one circumferential stiffener layer 42 comprising the curvilinear tearstraps 28 interlaid between the full layers 40, and at least one radial stiffener layer 44 comprising the radial stiffeners 22 interlaid between the full layers 40. In other embodiments, one or more full layers 40 is interlaid between the at least one radial stiffener layer 44 and the circumferential stiffener layer 42.

Figure 7:
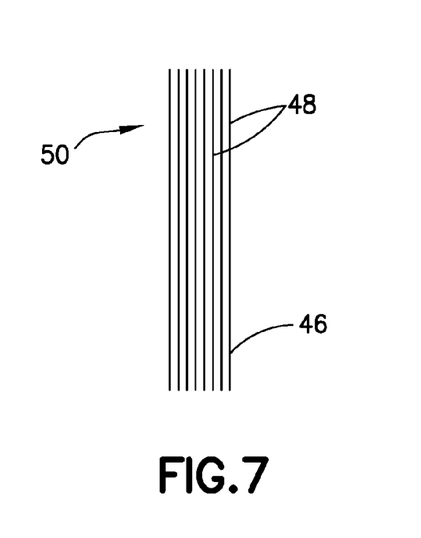
FIG. 7 is an illustration of a composite fiber material in the form of a tow with parallel uni-directional fibers therein that may be used to fabricate a pressure bulkhead.

The composite fiber material 46 may be any material system used in aerospace grade composites in the form of pre-impregnated tapes with resin and uni-directional fiber 48 combined or dry fiber material forms that consist of uni-directional fiber 48 held together with a binder. An illustration of a composite fiber material 46 in the form of a tow or tape 50 that may be used is shown in FIG. 7. The uni-directional fibers 48 are arranged in a single direction within the composite fiber material 46 and are generally parallel to each other. Any type of fiber that provides strength and preferably is lightweight may be used including carbon fiber, glass fiber, aramide fiber or similar engineering fibers. Typical resins in aerospace grade composites that may be used include thermoset resins, thermoplastic resins, bismaleimide (BMI) resins, polyimide resins or similar resins.

The composite fiber material 46 is preferably slit to form tows or tapes 50 having narrow widths of typically ½ inch, ¼ inch or ⅛ inch and uni-directional fibers 48 extending longitudinally through the composite fiber material. For example, in one embodiment, the composite fiber material 46 comprises a pre-impregnated carbon fiber epoxy thermosetting resin slit into tows having a width of ¼ inch and ⅛ inch, such as T800S Fiber 3900 Series Resin uni-directional slit tape tow available from Toray Composites (America), Inc., Tacoma, Wash., Hexcel 8552 IM7 uni-directional prepreg available from Hexcel Corporation, Stamford, Conn., or other similar products. In other embodiments, the composite fiber material 46 comprises a thermoplastic polymer system including a thermoplastic matrix of poly(ether-ether-ketone) commonly referred to as PEEK or poly(ether-ketone-ketone) commonly referred to as PEKK with aligned, continuous uni-directional fiber reinforcement, such as the APC-2 PEEK/IM7 or APC PEKK/IM7 products from Cytec Industries, Inc., Woodland Park, N.J. In other embodiments, the composite fiber material 46 comprises a dry fiber slit tape, such as the CYCOM 7720 binder coated uni-tapes, or a BMI material such as the CYCOM 5250-4/IM7, both available from Cytec Industries, or other similar materials.

Using carbon fiber material 46 in the form of tows or tapes 50 as described above enables processing by a fiber placement head 52 in automated fiber placement ("AFP") equipment to form all of the composite layers of the pressure bulkhead 10, including the stiffening layers, thus eliminating the need for secondary stiffening agents mechanically fastened or bonded to the pressure bulkhead 10. The fiber placement head 52 in the automated fiber placement equipment fabricates each of the full layers 40, the circumferential stiffener layer 42 and the radial stiffener layer 44, one layer at a time, and discretely orients the uni-directional fibers 48 in each layer to tailor the load paths in the pressure bulkhead 10. This process permits laying down the minimum amount of composite fiber material 46 to reduce cost while still obtaining the required strength to meet load and strain requirements. Automated fiber placement machines suitable for manufacturing the composite pressure bulkhead 10 of this disclosure are available, for example, from companies such as Electroimpact, Inc., Mukilteo, Wash., Fives Cincinnati, Hebron, Ky., Ingersoll Machine Tools, Inc., Rockford, Ill. and other similar manufacturers.

Figure 9A:
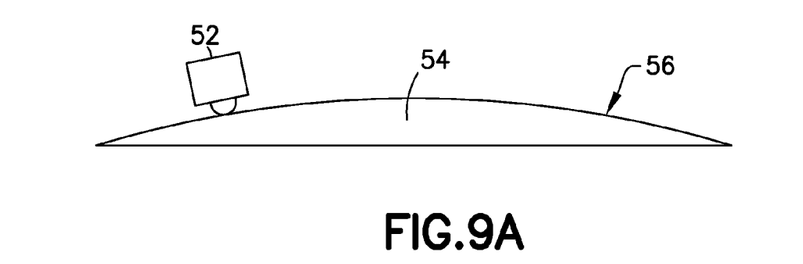
FIGS. 9A and 9B are illustrations of domed lay-up tools that may be used to fabricate pressure bulkheads in accordance with this disclosure.
Figure 9B:
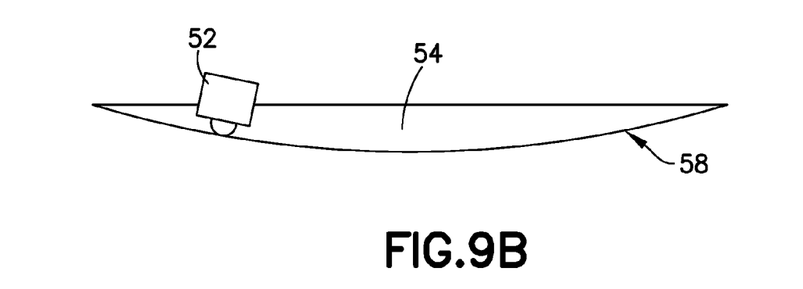

Referring to FIGS. 9A and 9B, a fiber placement head 52 in AFP equipment lays down one or more tows or tapes 50 of the composite fiber material 46 onto a lay-up tool 54 having a surface with the desired surface contour of the pressure bulkhead 10. In some embodiments, the fiber placement head 52 lays down 16-32 tows or tapes 50 at the same time to form a single layer. In the disclosed embodiment, the lay-up tool 54 is configured to form the domed-shape surface 11 of the pressure bulkhead 10. The lay-up tool 54 is not tool side specific; and may be configured with a concave tool surface 56 (FIG. 9A) or a convex tool surface 58 (FIG. 9B) both with varying radius, depth, diameter and eccentricity depending on the desired application and properties of the pressure bulkhead 10. The lay-up tool 54 comprises any material sufficient for composite lay-up such as steel or other metals, or a composite material.

Figure 6:
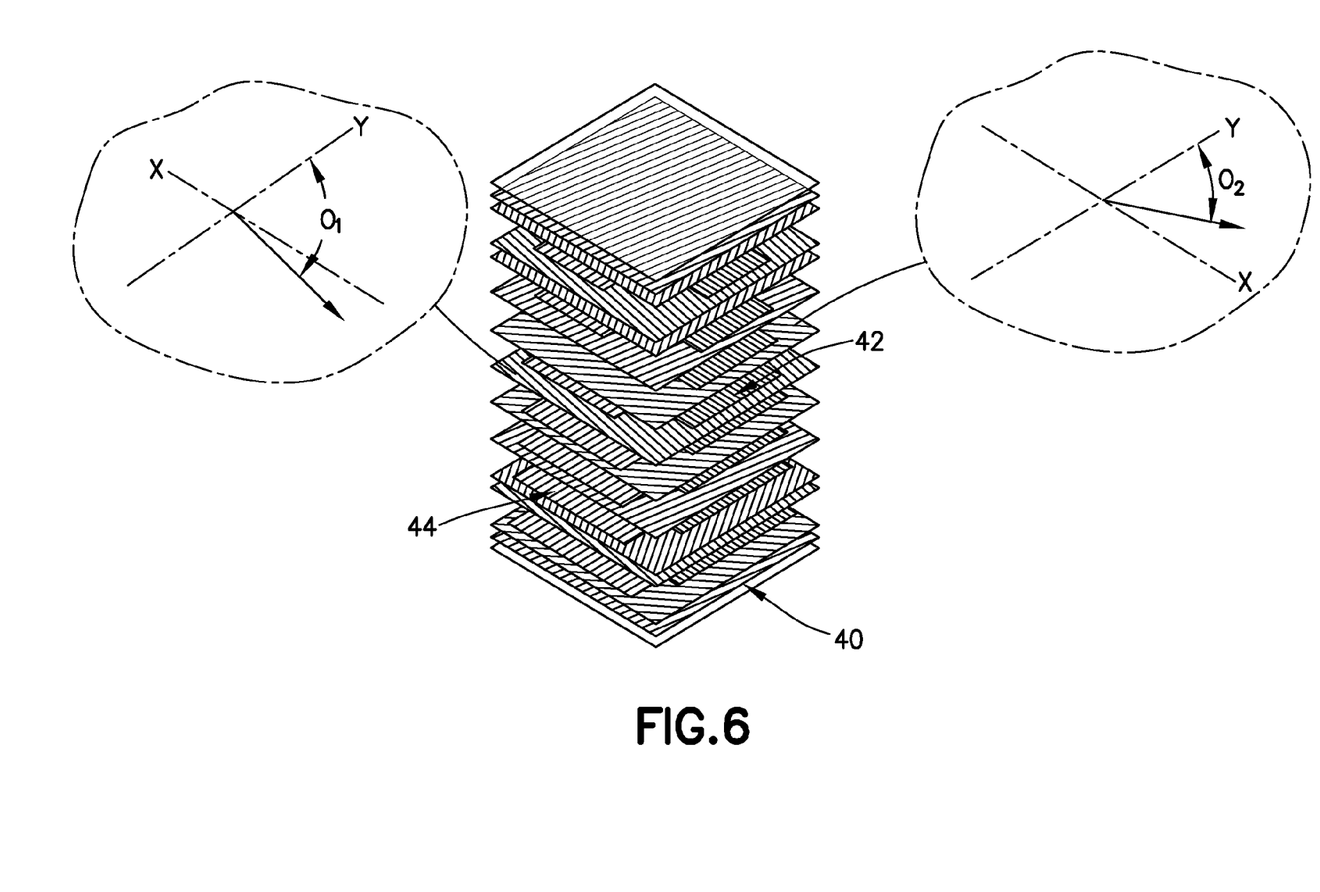
FIG. 6 is an illustration of another exploded view of a composite pressure bulkhead showing the orientation angles of uni-directional fibers in full layers.
Figure 10:
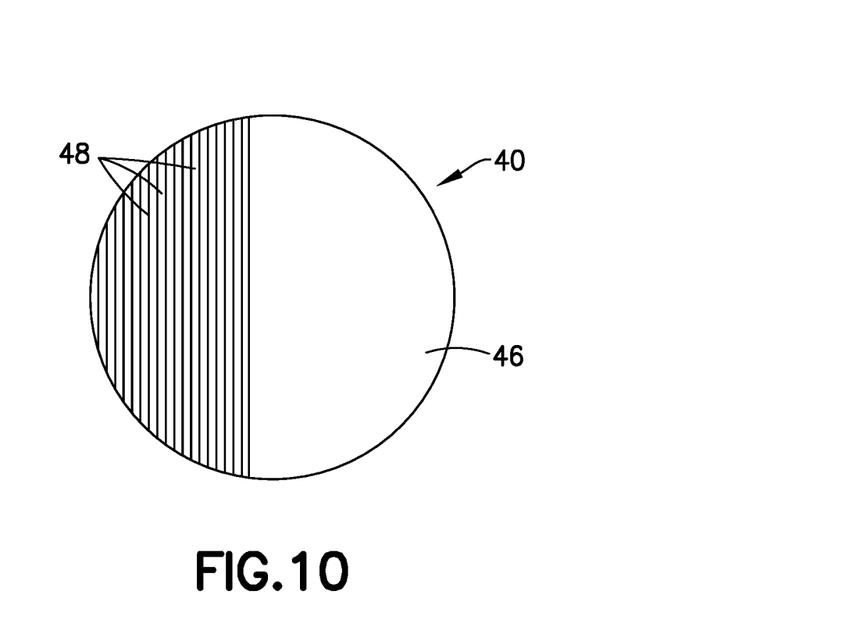
FIG. 10 is an illustration of a full layer that may be used in the pressure bulkheads in accordance with this disclosure.

An illustration of an elevational view of a partially formed full layer 40 of composite fiber material 46 is shown in FIG. 10. The full layers 40 have uni-directional fibers 48 arranged generally parallel to each other throughout the width of the full layer 40. To fabricate the full layers 40, an automated fiber placement machine head 52 lays down tows or tape 50 of carbon fiber material 46 in one direction adjacent to each other on the lay-up tool 54 until the full width of the full layer 40 is formed. Referring to FIG. 6, the uni-directional fibers 48 in each of the full layers 40 are positioned at an orientation angle O in the pressure bulkhead 10, such that the orientation angle O of the uni-directional fibers 48 in at least two of the full layers 40 is different (i.e., the orientation angle $O_1$ is different from the orientation angle $O_2$ in FIG. 6). For example, the full layers 40 may be stacked with orientation angles O that repeat through the thickness of the pressure bulkhead 10, or full layers 40 with the same orientation angles O can be placed adjacent one another.

Referring again to FIGS. 3 and 4, the radial stiffeners 22 are arranged within the pressure bulkhead 10 such that they are aligned in a direction of dominant load paths in the pressure bulkhead 10, as shown for example by the arrows R. Typically, internal loads under pressure loading in a pressure vessel are broken down into their two primary dominant load paths: the radial direction (i.e., meridian) and the circumferential direction (i.e., hoop). An aft pressure bulkhead in a fuselage, as disclosed herein, is an example of this type of structure; and the dominant load paths are how the cabin pressure is reacted internally across the bulkhead and at the fuselage interface.

The uni-directional fibers 48 in each of the radial stiffeners 22 are generally parallel to each other; and therefore also aligned in the direction of dominant load paths. For example, the radial stiffeners 22 may be evenly spaced about the pressure bulkhead 10 in a spoke-like fashion at consistent angular increments, such as about 15° increments, as shown in FIG. 4A, or any other angular degree increment. In other embodiments, the radial stiffeners 22 may be unevenly spaced at inconsistent angular increments such that the angular degree between successive radial stiffeners 22 is not the same, as shown in FIG. 4B (for example, angles 1, 2 and 3 are all different). It is not necessary for the radial stiffeners 22 to intersect the exact center of pressure bulkhead. In the disclosed embodiments, the radial stiffeners 22 intersect with the central portion 24 of the pressure bulkhead. The radial stiffeners 22 may include shorter radial stiffeners 32, longer radial stiffeners 34 or combinations of both. The quantity, angle, angular increments, width, length and arrangement of the radial stiffeners 22 are determined through analysis of the load requirements for the desired application, such as an aircraft in which the pressure bulkhead 10 is installed, the shape of the pressure bulkhead 10, weight considerations, and any regulations. In the disclosed embodiments, the radial stiffeners 22 are laid down only where they are needed for a particular application in any direction and size, thus saving material cost and reducing weight of the pressure bulkhead 10.

Figure 8:
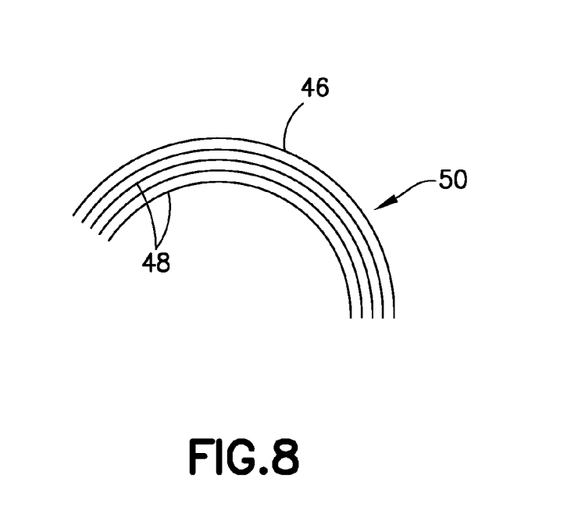
FIG. 8 is an illustration of a composite fiber material in the form or a curved tow with uni-directional fibers steered in a defined path.

The curvilinear tearstraps 28 are arranged within the pressure bulkhead 10 such that the uni-directional fibers 48 in each curvilinear tearstrap 28 are aligned about 0° along a circumferential spline of the pressure bulkhead 10 at varying distances from the central portion 24 of the pressure bulkhead 10. Thus, the curvilinear tearstraps 28 are also aligned in the direction of the dominant load paths (i.e., the hoop). The curvilinear tearstraps 28 may be concentric about a center point of the central portion 24, but need not be. The curvilinear tearstraps 28 have a curvilinear shape, for example, a complete circle, a partial circle, a complete oval, a partial oval, a complete ellipse or a partial ellipse, or any other curvilinear shape. The curvilinear shape need not be equidistant to the center point of the central portion 24. FIG. 3 shows four curvilinear tearstraps 28 having a generally oval shape and FIG. 4 shows two curvilinear tearstraps 28 having a generally circular shape all forming complete curvilinear shapes about the central portion 24 of the pressure bulkhead 10. In other embodiments, the curvilinear tearstraps 28 form one or more partial curvilinear shapes about the central portion 24. As shown in FIG. 4, the uni-directional fibers 48 in the curvilinear tearstraps 28 are tow steered to the same direction, shown by arrows C about the central portion 24 of the pressure bulkhead 10. An example of a tow or tape 50 after being laid-up by a fiber placement head 52 to form a partial curvilinear tearstrap 28 is shown in FIG. 8. The uni-directional fibers 48 in the composite material 46 are steered to form a curved path and to maintain consistent spacing between each of the uni-directional fibers 48. The quantity and arrangement of curvilinear tearstraps 28, and the width, shape and length of each of the curvilinear tearstraps 28 is dependent on the damage tolerance and load requirements of the aircraft 12.

The radial stiffeners 22 and the curvilinear tearstraps 28 are aligned in the directions of the dominant load paths by automated fiber placement methods disclosed herein, and provide weight advantages and cost efficiencies over typical horizontal and vertical grid patterns while balancing the need for robustness under failure conditions with the need for suitable load distribution during pressurized conditions.

Figure 11:
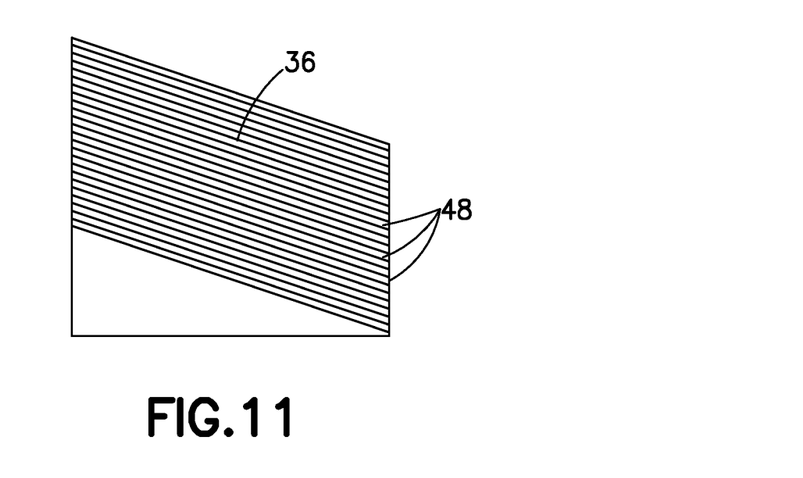
FIG. 11 is an illustration of a part of an edge band in a pressure bulkhead in accordance with this disclosure.
Figure 12A:
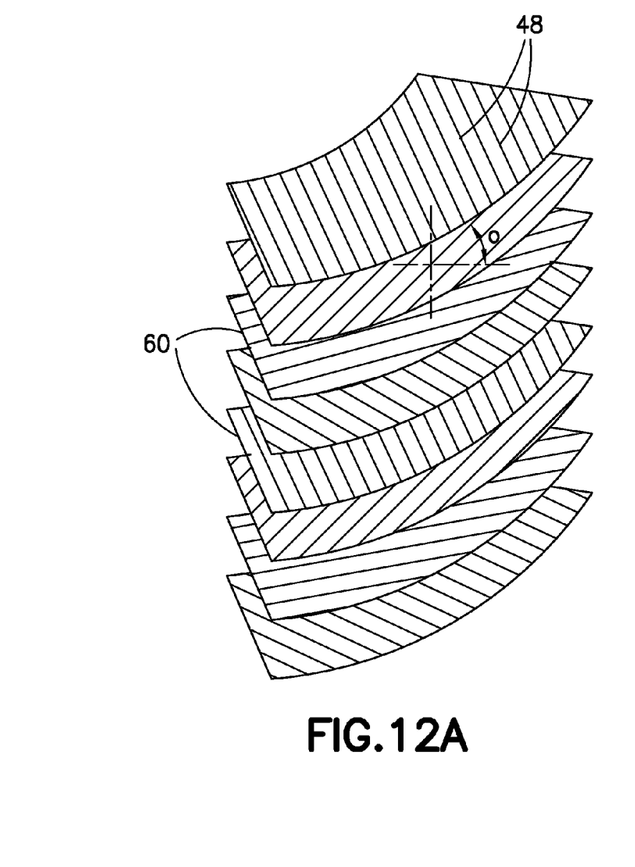
FIGS. 12A and 12B are illustrations of partial edge band layers in various embodiments.
Figure 12B:
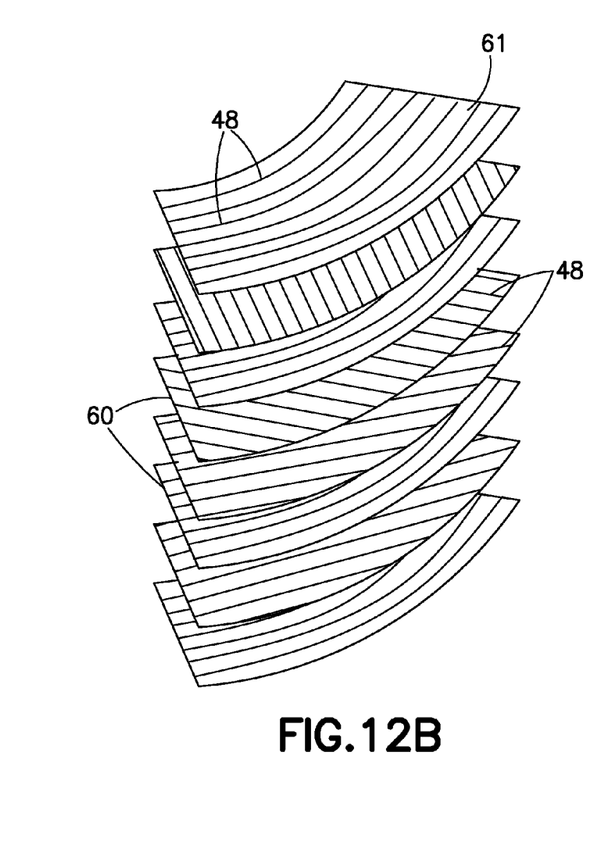

Referring to FIGS. 3 and 11, an edge band 36 is formed at or proximate the periphery 26 of the pressure bulkhead 10, and is used for attaching the pressure bulkhead 10 to the fuselage 14 or other structures in a vehicle. In one embodiment, shown in FIG. 11, an outermost circumferential tearstrap 28 forms the edge band 36, and also has uni-directional fibers 48 aligned about 0° along a circumferential spline of the pressure bulkhead 10. In other embodiments, referring to FIGS. 5 and 12A, one or more separate edge band layers 60 is formed during fabrication of the pressure bulkhead 10 in order to build up thickness at the periphery of the pressure bulkhead 10 to fulfill surrounding structure integration requirements. The edge band layers 60 in this embodiment, similar to the full layers 40 have uni-directional fibers 48 extending generally parallel to each other and positioned at varying orientation angles O in the pressure bulkhead 10. In another embodiment of an edge band layer 60 shown in FIG. 12B, an edge band 36 having uni-directional fibers 48 aligned about 0° along a circumferential spline of the pressure bulkhead 10 is incorporated into the stack of edge band layers 60. In all embodiments, the thickness of the edge band 36 and number of layers of edge band 36 is determined by the requirements of the interfacing structure in the vehicle. The pressure bulkhead 10 is designed to be interchanged with existing bulkhead to fuselage attachment members.

Figure 5:
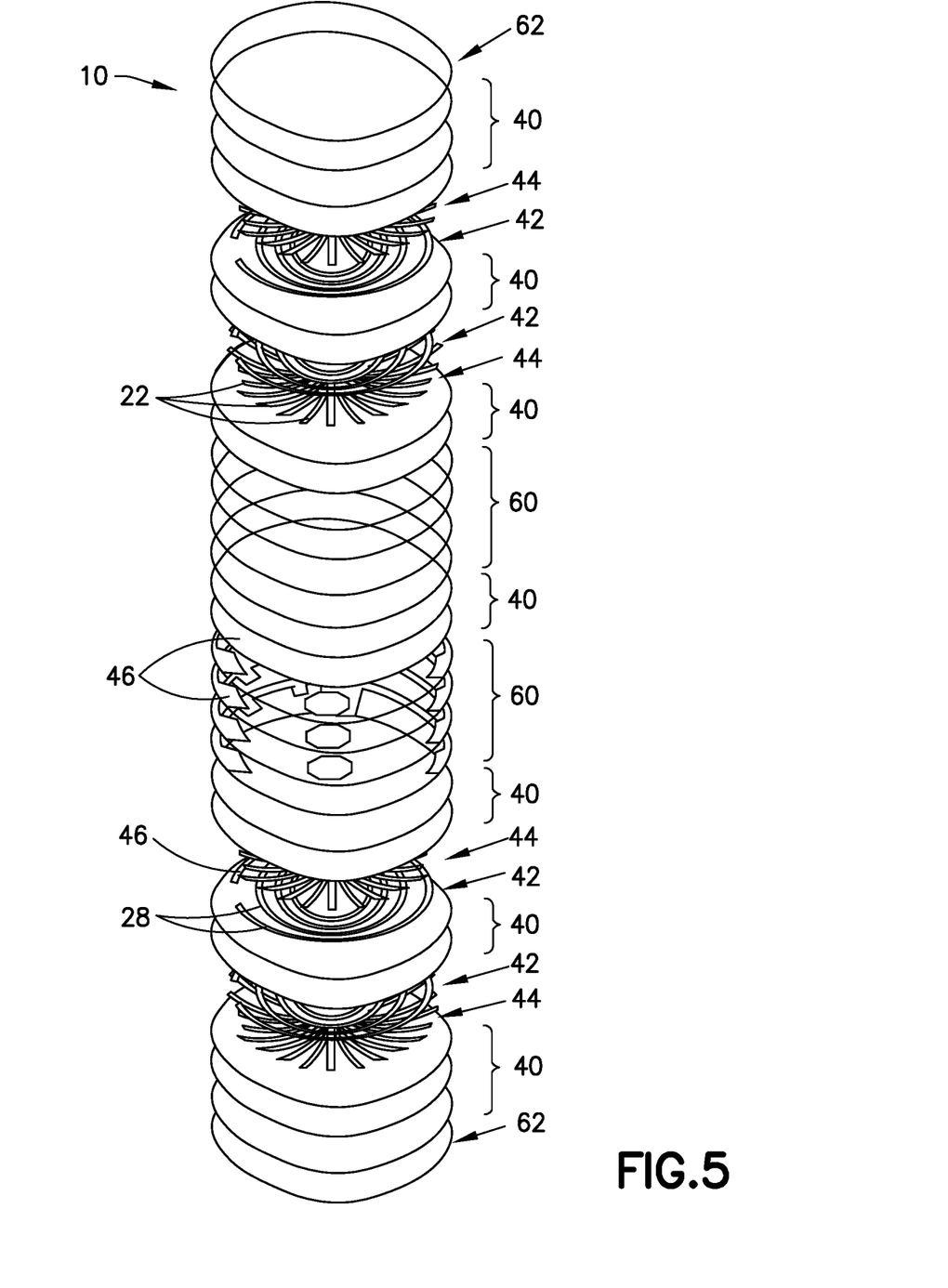
FIG. 5 is an illustration of an exploded view of a composite pressure bulkhead in accordance with this disclosure showing the constituent composite layers that form the pressure bulkhead.

FIG. 5 is an illustration of an exemplary pressure bulkhead 10 comprising two or more full layers 40 of the composite fiber material 46, at least one circumferential stiffener layer 42 comprising the curvilinear tearstraps 28 interlaid between the full layers 40, and at least one radial stiffener layer 44 comprising the radial stiffeners 22 interlaid between the full layers 40. More particularly, this example includes optional bottom and top fiberglass isolation plies 62 with the layers of composite fiber material 46 therebetween. Isolation plies 62 are useful when the pressure bulkhead 10 is contact with a metal surface and helps with drilling, but are not necessary. Starting from the bottom, three full layers 40 are laid-up onto the bottom fiberglass coating layer 62. A radial stiffener layer 44 with radial stiffeners 22 is laid-up onto the full layers 40. A circumferential stiffener layer 42 is laid-up onto the radial stiffener layer 44. Two full layers 40 are then laid-up. A circumferential stiffener layer 42 is laid-up onto the full layers 40 and a radial stiffener layer 44 is laid-up onto the circumferential stiffener layer 42. Two more full layers 40 are then laid up, and four edge band layers 60 are laid up onto the full layers 40. Additional full layers 40, edge band layers 60, radial stiffener layers 44 and circumferential stiffener layers 42 are laid-up to form a pressure bulkhead 10 for a particular application, with radial stiffeners 22 discretely oriented in the direction of the dominant load paths. The configuration and number of layers in the pressure bulkhead 10 will be modified depending on the application and load requirements. As shown, the radial stiffener layer 44, the circumferential stiffener layers 42 and the edge band layers 60 are interlaid between full layers 40. In other embodiments, one or more full layers 40 may be interlaid between a circumferential stiffener layer 42 and a radial stiffener layer 44.

Figure 13:
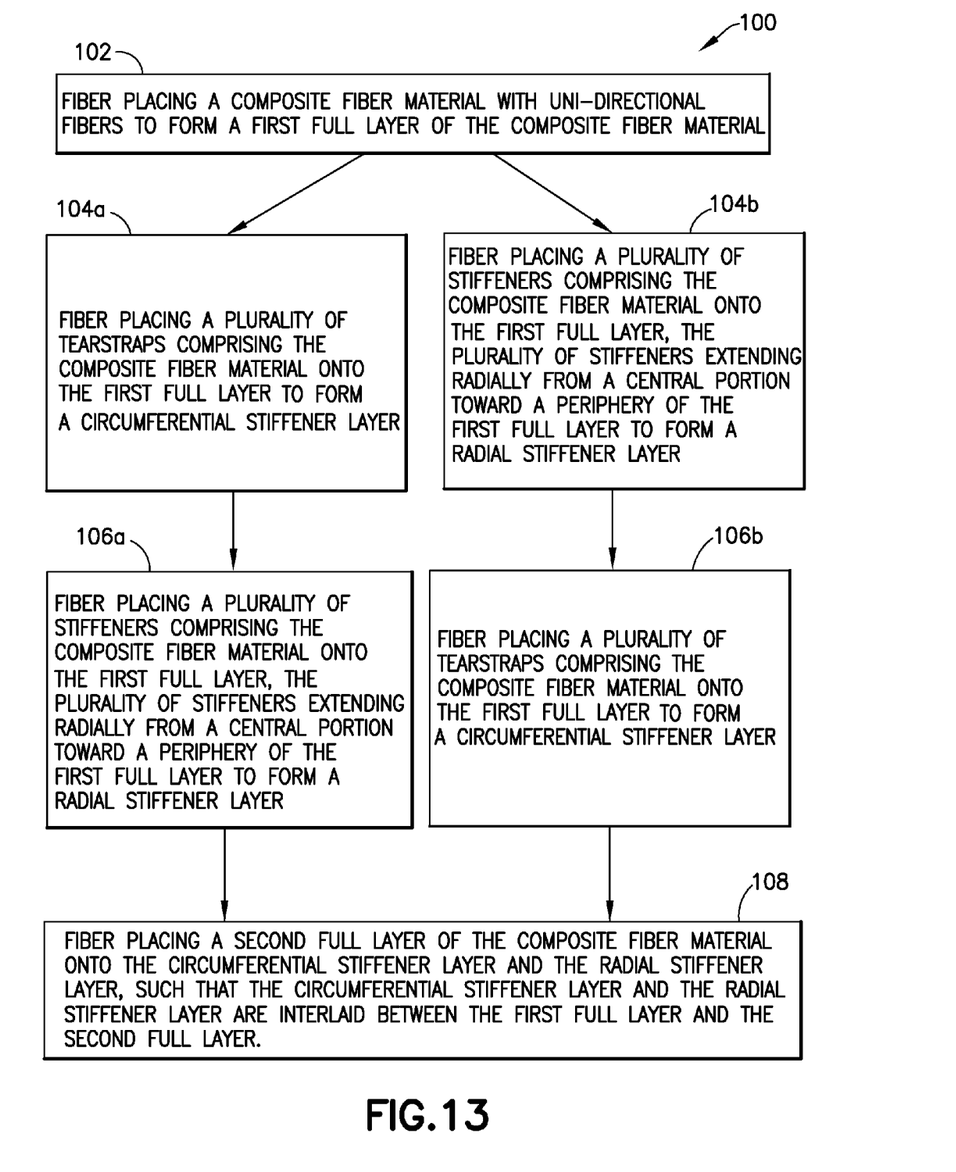
FIG. 13 is an illustration of a flow diagram of an exemplary method for manufacturing a pressure bulkhead in accordance with this disclosure.

FIG. 13 is an illustration of a flow diagram of an exemplary embodiment of a method 100 of manufacturing a pressure bulkhead 10 comprising a plurality of layers of composite fiber material 46 having uni-directional fibers 48 arranged in a single direction within the composite fiber material 46 in accordance with this disclosure. In step 102 of the method, the composite fiber material 46 is fiber placed with a fiber placement head 52 of an automated fiber placement machine in adjacent rows on a lay-up tool 54 to form a first full layer 40 of composite fiber material 46. The next steps in the method fiber place either a circumferential stiffener layer 42 (step 104a) or a radial stiffener layer 44 (step 104b) on the first full layer 40, and then fiber place either a radial stiffener layer 44 (step 106a) or a circumferential stiffener layer 42 (step 106b) on the first full layer 40. It is not important which of these layers is laid-up first on the full layer 40. The circumferential stiffener layer 42 is fabricated by fiber placing a plurality of curvilinear tearstraps 28 comprising the composite fiber material 46 generally about a central portion 24 of the full layer 40. The radial stiffener layer 44 is fabricated by fiber placing a plurality of stiffeners to extend radially from the central portion 24 toward a periphery 26 of the full layer 40. In step 108, a second full layer 40 of the composite fiber material 46 is laid-up by fiber placement onto the circumferential stiffener layer 42 and the radial stiffener layer 44, such that the circumferential stiffener layer 42 and the radial stiffener layer 44 are interlaid between the full layers 40.

In the method 100, the uni-directional fibers 48 in the first full layer 40 are fiber placed at a first orientation angle $O_1$ and the uni-directional fibers 48 in the second full layer 40 are fiber placed at a second orientation angle $O_2$ which is different from the first orientation angle. The uni-directional fibers 48 in each of the stiffeners in the radial stiffener layer 44 are aligned in a direction of dominant load paths in the pressure bulkhead 10. For example, the stiffeners in the radial stiffener layer 44 may be oriented at about consistent angular increments, such as 15° increments, or at inconsistent angular increments. The curvilinear tearstraps 28 form a partial or a complete curvilinear shape generally about the central portion 24, and the uni-directional fibers 48 in each of the curvilinear tearstraps 28 are arranged to rotate generally about the central portion 24 in the same direction. The method 100 also comprises forming an edge band 36 proximate the periphery 26 of the pressure bulkhead 10 with one of the tearstraps 28 or a separate edge band layer 60 may be fiber placed between the full layers 40, the edge band layer 60 comprising an edge band 36 positioned proximate the periphery 26 of the pressure bulkhead 10 and having uni-directional fibers 48 extending either generally about the central portion 24 of the pressure bulkhead 10 or generally parallel to each other. In another embodiment of the method, a third full layer 40 or more full layers 40 may be fiber placed between the circumferential stiffener layer 42 and the radial stiffener layer 44.

While products and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The process claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A pressure bulkhead comprising:
 a plurality of layers of composite fiber material having uni-directional fibers arranged in a single direction within the composite fiber material, the plurality of layers including:
  two or more full layers of the composite fiber material;
  a circumferential stiffener layer interlaid between the full layers and comprising a plurality of curvilinear tearstraps; and
  a radial stiffener layer interlaid between the full layers and comprising a plurality of stiffeners extending radially from a central portion of the pressure bulkhead toward a periphery of the pressure bulkhead.

2. The pressure bulkhead of claim 1, wherein the curvilinear tearstraps have a curvilinear shape selected from the group consisting of a complete circle, a partial circle, a complete oval, a partial oval, a complete ellipse and a partial ellipse.

3. The pressure bulkhead of claim 2, wherein the curvilinear tearstraps are positioned generally about the central portion of the pressure bulkhead.

4. The pressure bulkhead of claim 1, wherein the uni-directional fibers of the stiffeners in the radial stiffener layer are generally parallel to each other and aligned in a direction of dominant load paths in the pressure bulkhead.

5. The pressure bulkhead of claim 1, wherein the stiffeners in the radial stiffener layer are positioned at consistent angular increments.

6. The pressure bulkhead of claim 1, wherein the stiffeners in the radial stiffener layer are positioned at inconsistent angular increments.

7. The pressure bulkhead of claim 1, wherein the uni-directional fibers in the curvilinear tearstraps are arranged such that the uni-directional fibers extend in the same direction generally about the central portion of the pressure bulkhead.

8. The pressure bulkhead of claim 1, wherein one of the curvilinear tearstraps in the circumferential stiffener layer forms an edge band proximate the periphery of the pressure bulkhead.

9. The pressure bulkhead of claim 1, further comprising an edge band layer interlaid between the full layers, the edge band layer comprising an edge band positioned proximate the periphery of the pressure bulkhead and having uni-directional fibers extending circumferentially around the periphery of the pressure bulkhead.

10. The pressure bulkhead of claim 1, further comprising an edge band layer interlaid between the full layers, the edge band layer comprising an edge band positioned proximate the periphery of the pressure bulkhead and having uni-directional fibers extending generally parallel to each other and positioned at an orientation angle in the pressure bulkhead.

11. The pressure bulkhead of claim 1, wherein one or more of the full layers is positioned between the circumferential stiffener layer and the radial stiffener layer.

12. A method for manufacturing a pressure bulkhead comprising a plurality of layers of composite fiber material having uni-directional fibers within the composite fiber material, the method comprising the steps of:
 fiber placing the composite fiber material in adjacent rows to form a first full layer of the composite fiber material;
 fiber placing a plurality of curvilinear tearstraps comprising the composite fiber material onto the first full layer to form a circumferential stiffener layer;
 fiber placing a plurality of stiffeners comprising the composite fiber material onto the first full layer, the plurality of stiffeners extending radially from a central portion toward a periphery of the first full layer to form a radial stiffener layer; and
 fiber placing a second full layer of the composite fiber material onto the circumferential stiffener layer and the radial stiffener layer, such that the circumferential stiffener layer and the radial stiffener layer are interlaid between the first full layer and the second full layer.

13. The method of claim 12, further comprising aligning the uni-directional fibers in the stiffeners in the radial stiffener layer in a direction of dominant load paths in the pressure bulkhead.

14. The method of claim 13, further comprising arranging the stiffeners in the radial stiffener layer at consistent angular increments.

15. The method of claim 13, further comprising arranging the stiffeners in the radial stiffener layer at inconsistent angular increments.

16. The method of claim 12, wherein the curvilinear tearstraps form a partial or a complete curvilinear shape about the central portion.

17. The method of claim 16, further comprising arranging the uni-directional fibers in the tearstraps such that the uni-directional fibers rotate in the same direction.

18. The method of claim 12, further comprising forming an edge band proximate the periphery of the pressure bulkhead with one of the tearstraps.

19. The method of claim 12, further comprising fiber placing an edge band layer between the first full layer and the second full layer, the edge band layer comprising an edge band positioned proximate the periphery of the pressure bulkhead and having uni-directional fibers extending about the central portion of the pressure bulkhead.

20. The method of claim 12, further comprising fiber placing a third full layer between the circumferential stiffener layer and the radial stiffener layer.

* * * * *